United States Patent [19]

Vincent et al.

[11] Patent Number: 5,460,412
[45] Date of Patent: Oct. 24, 1995

[54] MUD FLAP

[75] Inventors: Gerald P. Vincent, Winnipeg; Edward E. Eichler, Beasejour; Edward J. Nemetchek, Swan River, all of Canada

[73] Assignee: GFY Marine Industries Ltd., Winnipeg, Canada

[21] Appl. No.: 181,173

[22] Filed: Jan. 13, 1994

[51] Int. Cl.$^6$ ................................................. B62D 25/16
[52] U.S. Cl. ........................................................... 280/851
[58] Field of Search .................................. 280/851, 848, 280/847, 852; 24/367, 368

[56] References Cited

U.S. PATENT DOCUMENTS

| | | | |
|---|---|---|---|
| 2,826,428 | 3/1958 | Lincoln | 280/851 |
| 3,711,119 | 1/1973 | Hollingsworth | 280/851 |
| 3,778,086 | 12/1973 | Moore et al. | 280/851 |
| 4,043,568 | 8/1977 | Hollon | 280/851 |
| 4,268,053 | 5/1981 | Toppins et al. | 280/851 |
| 4,726,599 | 2/1988 | Antekeier et al. | 280/851 |

*Primary Examiner*—Richard M. Camby
*Attorney, Agent, or Firm*—Harness Dickey & Pierce

[57] ABSTRACT

A mud flap comprises a rigid element which is permanently attached to a vehicle, a bracket depending from the bottom of the rigid element, and a flexible flap element releasably attached within a channel of the bracket. Pins through holes in the channel walls form the releasable attachment. The pins terminate in resilient detents. When a detent is not deformed, the shaft and detent is larger than the holes in the channel walls. This serves to retain the pin within the holes in normal use. However, an operator may nevertheless grasp the enlarged pin head and extract the pin when it is desired to remove the releasable element.

9 Claims, 2 Drawing Sheets

MUD FLAP

BACKGROUND OF THE INVENTION

1. Field of the Invention

This invention relates to a mud flap for vehicle.

2. Description of the Related Art

Mud flaps are commonly employed behind the wheels of vehicles. In the trucking industry, mud flaps are generally bolted or rivetted in place. Trucks typically see heavy road use and, therefore, the mud flaps for the trucks wear relatively quickly. Furthermore, the clearance of the frame of a truck or truck trailer from the road varies with the load on board. Consequently, with a heavy load, the mud flaps may sometimes drag on the road surface, which shortens their useful life.

The rivets or bolts joining the mud flaps to the truck or truck trailer tend to corrode with time, especially in jurisdictions which salt roads. This enhances the difficulty in replacing the mud flaps. In any event, the bolts or rivets are not readily accessible and are not easy to remove such that replacement of the mud flaps is a difficult chore.

This invention seeks to overcome drawbacks of the known prior art.

SUMMARY OF THE INVENTION

According to the present invention, there is provided a mud flap having a first relatively rigid flap element designed for permanent attachment to a vehicle, a bracket extending from an end of said first flap element having a channel receiving an end of a second, relatively flexible, flap element, said bracket having opposed channel walls with pairs of aligned holes aligned with holes in a top margin of said second flap element, and a plurality of pins, each pin having an enlarged head, a shaft received by one pair of aligned holes, and a radially extending displaceable detent carried by said shaft and biased to an extended position such that said shaft with extended detent is retained within said one pair of holes, whereby one of said pins may move through a hole of said one pair of holes only by applying an axial force sufficient to displace the detent of said one of said pins.

BRIEF DESCRIPTION OF THE DRAWINGS

In the figures which disclose example embodiments of the invention.

DESCRIPTION OF THE PREFERRED EMBODIMENTS

Figures 1, 2:
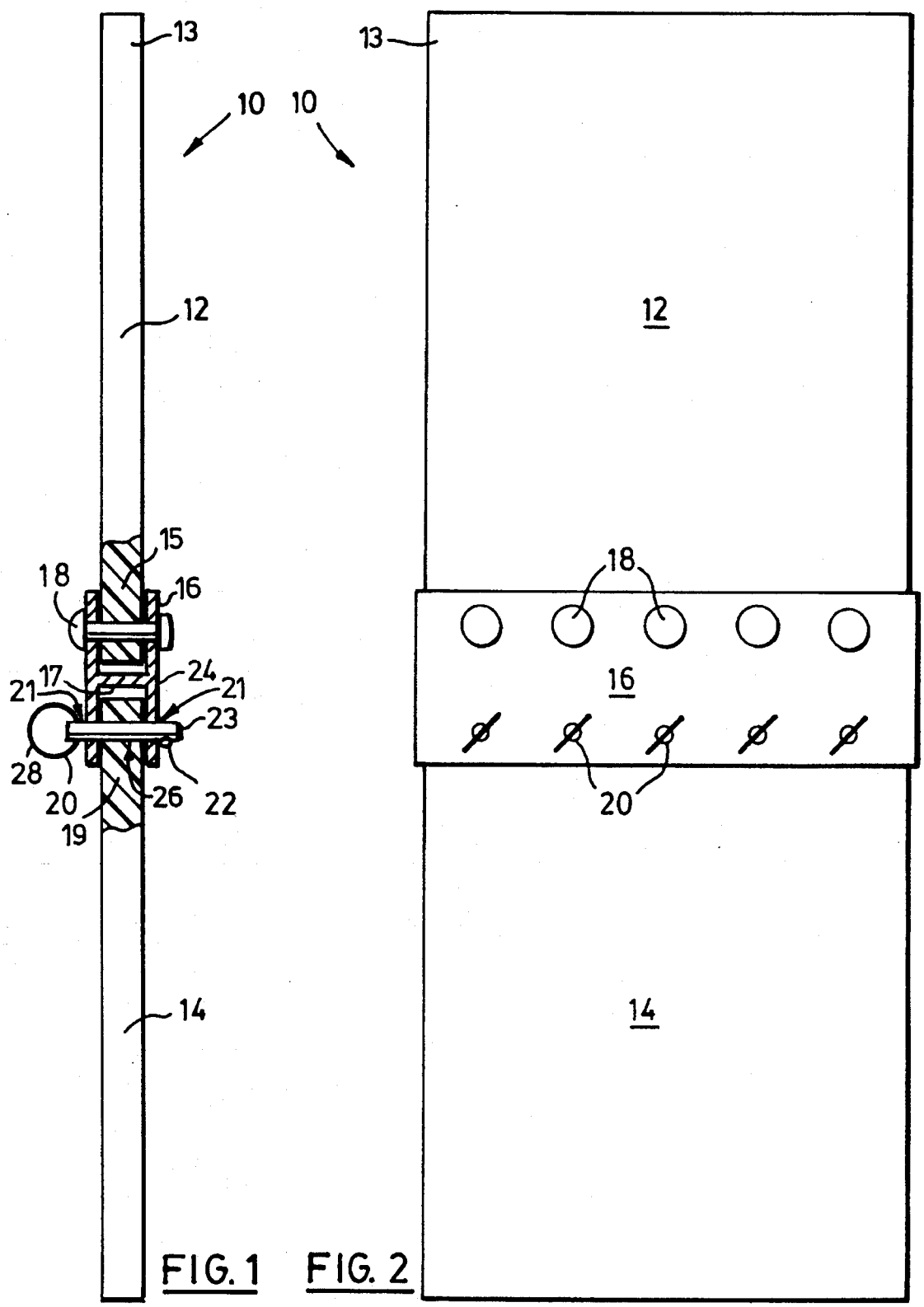
FIG. 1 is a partially sectioned side view of a mud flap made in accordance with an embodiment of this invention.
FIG. 2 is a front view of the mud flap of FIG. 1.
Figure 3:
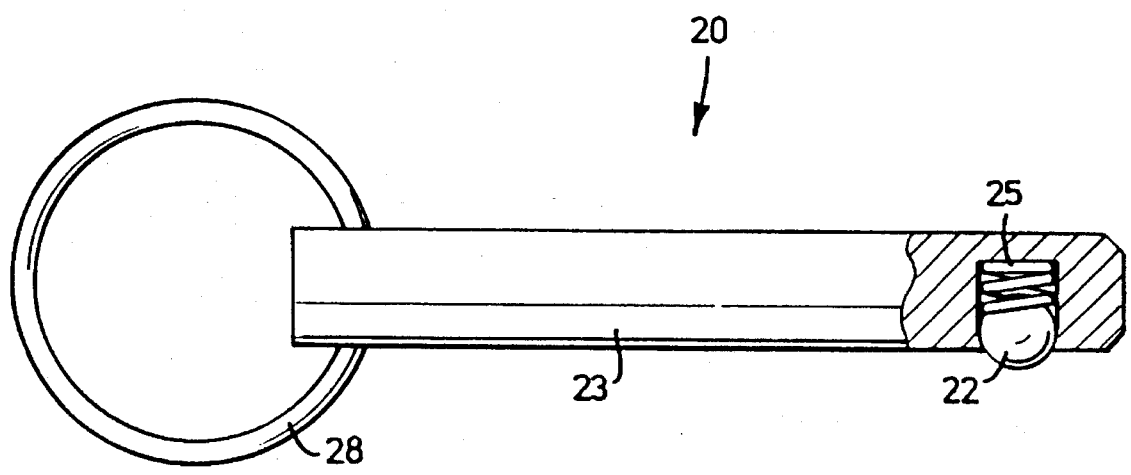
FIG. 3 is a partially sectioned side view of a pin used in the mud flap of FIGS. 1 and 2.

With reference to FIGS. 1 and 2, a mud flap 10 comprises a first flap element 12. Flap element 12 is fabricated of a relatively rigid material, preferably a polycarbon material, such as LEXAN* or HYZOD*. Flap element 12 is designed for permanent attachment to a vehicle, preferably a truck or truck trailer. In this regard, rivets or bolts may be driven through the top margin 13 of the first element in order to secure the first element to a vehicle. A bracket 16 depends from the bottom margin 15 of the first flap element, being joined to the first flap element by rivets 18. The bracket has a channel 17 which receives the top margin 19 of a second flap element 14. The second flap element 14 is fabricated of a relatively flexible \* A trademark material such as rubber. The second flap element is releasably secured to the first flap element by pins 20 which extend through holes 21 in the walls 24 of the channel 17 as well as through holes 26 in the top margin 19 of the second flap element 14. With reference to FIG. 3, each pin 20 has an enlarged head 28 and a shaft 23 terminating in a displaceable detent 22 biased to an extended position by spring 25, as illustrated in FIG. 3. The pin is sized such that the shaft with the detent in its extended position is larger than the holes 21 (FIG. 1) through the walls of the channel 17 (FIG. 1). Displaceable detent 22 is displaceable from its extended position against the sizing of spring 25; in consequence, returning to FIG. 1, the only way to pass a pin through holes 21 in the channel walls and holes 26 in mud flap 14 is by applying an insertion (or withdrawal) force sufficient to overcome spring 25 and displace detent 22. Preferably pins 20 are fabricated from stainless steel.

In use, when mud flap 10 has been installed on a vehicle, flap element 14 will bear the brunt of the wear since it is the lower section of the mud flap and is therefore the one most often hit by debris thrown from the wheels. It is also the section which could make contact with the road. When flap element 14 has worn to the point that it requires replacement, pins 20 may be pulled from holes 21, 26 by an operator in order to release the second element 14 from bracket 16. Thereafter, a replacement flap element 14 may be positioned within channel 17 of bracket 16 and the pins 20 again pushed through holes 21 in the walls of the channel and holes 26 in the new flap element 14 to join the new flap element 14 with flap element 12.

While the removal force required to extract pins 20 from holes 21, 26 may increase if the pins are corroded, it will be apparent to those skilled in the art that the effort will be low as compared with the effort needed to extract a corroded bolt or rivet from a mud flap. Further, since pins 20 are positioned medially on the mud flap, they are more accessible than any bolts or rivets at the top margin of the mud flap.

In normal operation, pins 20 will not work themselves free from the holes 21 in the channel walls and holes 26 in flap element 14 because of the detents 22 which act to restrain the pin shafts from free passage through the holes.

Pins 20 could be linked with a wire which is tethered to bracket 16; this would ensure the pins were not lost when removed.

It will be apparent to those skilled in the art that the detents 22 could be resilient, and therefore displaced by deformation rather than being spring biased. Further, rivets 18 could be replaced by bolts, plugs or other fasteners. The bracket 16 may be made of aluminum or stainless or galvanized steel. Other modifications will be apparent to those skilled in the art and, therefore, the invention is defined in the claims.

We claim:

1. A mud flap having a first relatively rigid flap element designed for permanent attachment to a vehicle, a second relatively flexible flap element and means to releasably attach said second flap element to said first flap element, said releasable attachment means comprising a bracket depending from an end of said first flap element having a channel for reception of an end of said second flap element, said bracket having opposed channel walls with pairs of aligned holes for alignment with holes in a top margin of said second flap element, and a plurality of pins, each pin having an enlarged head, a shaft for reception by a pair of aligned holes, and a radially extending displaceable detent carried by said shaft and biased to an extended position, said detent sized such that said shaft with extended detent may not pass through said pair of aligned holes, whereby each said pin may move through a pair of aligned holes only by applying an axial force sufficient to displace the detent of said pin.

2. The mud flap of claim 1 wherein said detent is spring biased to said extended position.

3. The mud flap of claim 1 wherein, for each said pin, said detent is positioned adjacent a free end of said shaft.

4. The mud flap of claim 3 wherein said enlarged head comprises a finger ring.

5. The mud flap of claim 4 wherein said second flap element has an end-to-end longitudinal extent similar to an end-to-end longitudinal extent of said first flap element.

6. The mud flap of claim 4 wherein said first flap element, prior to attachment to a vehicle, is free of holes therethrough apart from any holes associated with said bracket.

7. A mud flap having a first relatively rigid flap element designed for permanent attachment to a vehicle, a bracket extending from an end of said first flap element having a channel receiving an end of a second, relatively flexible, flap element, said bracket having opposed channel walls with pairs of aligned holes aligned with holes in a top margin of said second flap element, and a plurality of pins, each pin having an enlarged head, a shaft received by one pair of aligned holes, and a radially extending displaceable detent carried by said shaft and biased to an extended position such that said extended detent retains said shaft within said one pair of holes, whereby one of said pins may move through a hole of said one pair of holes only by applying an axial force sufficient to displace the detent of said one of said pins.

8. The mud flap of claim 7 wherein, for each said pin, said detent is positioned adjacent a free end of said shaft.

9. The mud flap of claim 7 wherein said enlarged head comprises a finger ring.

* * * * *